Aug. 12, 1969  MASAHARU KUBOKAWA  3,460,400
SHOCK ABSORBING STEERING WHEEL ASSEMBLY FOR A MOTOR VEHICLE
Filed Oct. 18, 1967  3 Sheets-Sheet 1

INVENTOR.
MASAHARU KUBOKAWA
BY Kelman and Berman
Agents

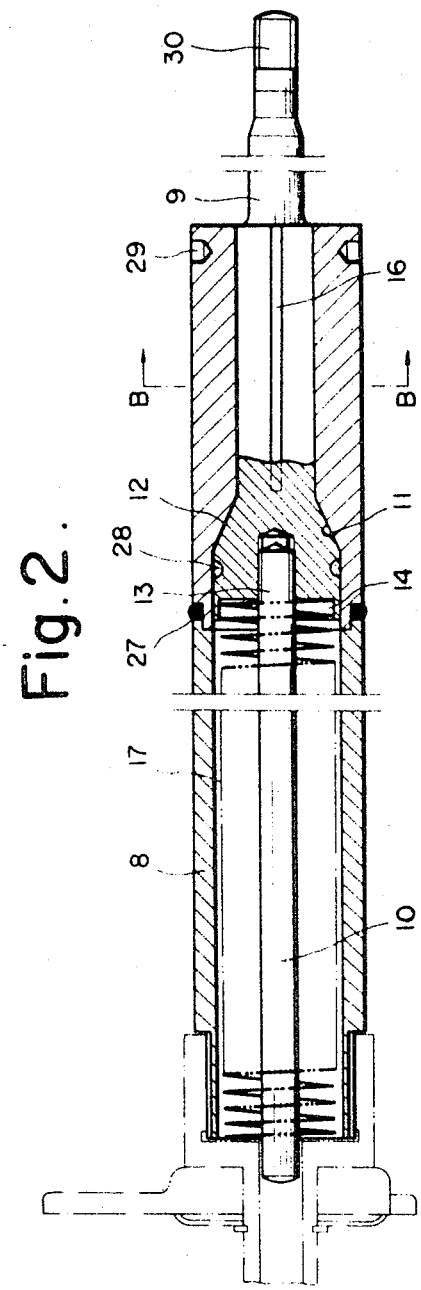
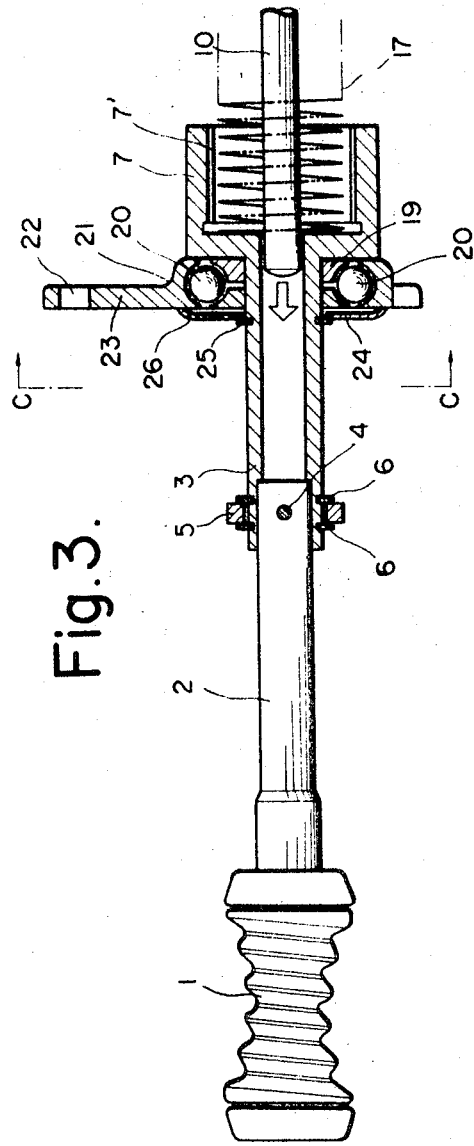

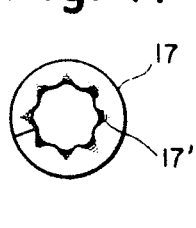
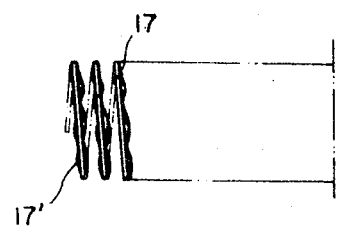
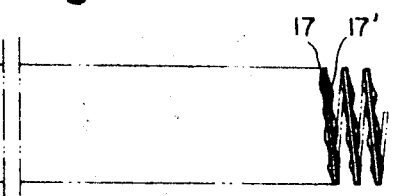
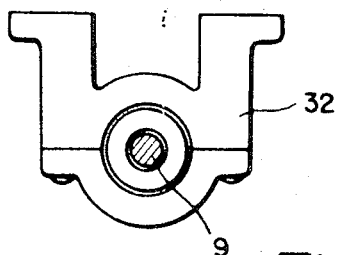
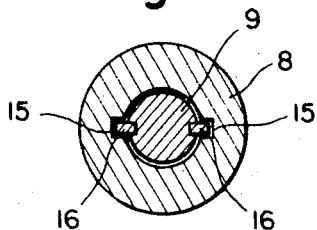
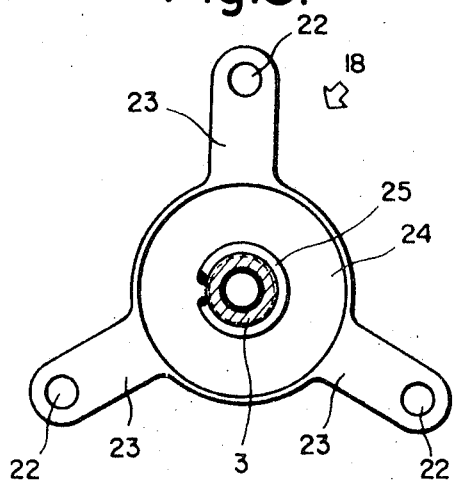

United States Patent Office 3,460,400
Patented Aug. 12, 1969

3,460,400
SHOCK ABSORBING STEERING WHEEL
ASSEMBLY FOR A MOTOR VEHICLE
Masaharu Kubokawa, 3-11-8 Minaminagasaki,
Toshima-ku, Tokyo, Japan
Filed Oct. 18, 1967, Ser. No. 676,326
Claims priority, application Japan, June 19, 1967,
42/39,204
Int. Cl. B62d 1/18
U.S. Cl. 74—492                                4 Claims

ABSTRACT OF THE DISCLOSURE

A steering column mainly consisting of two terminal shafts and a sleeve coaxially receiving a portion of one shaft in keyed connection permitting relative axial movement, but not relative rotation, the sleeve being fixedly fastened to the other shaft. A coil spring coaxially received between the sleeve and the portion of the first-mentioned shaft biases the shaft outward of the shaft into conforming engagement of axially tapering abutment faces on the shaft and on the sleeve during normal operation. Elevations and depressions give the inner peripheral portion of the spring a wavy configuration.

---

This invention relates to steering wheel assemblies for motor vehicles, and in particular to steering wheel means for motor vehicles which is adapted to absorb shocks to which the steering wheel is subjected.

Marked advances have been made in recent years in the progress of automobile industry. However, a dramatic increase in the number of motor vehicles used for both business and pleasure has inevitably been accompanied by an increase in the number of accidents involving motor vehicles. When an accident involving a motor vehicle occurs, men on the vehicle, especially a driver, suffer injuries, often leading to death. This is due to a great shock to which the driver is subjected when a collision occurs. The results of experiments on automobile accidents show that when a collision occurs while a motor vehicle is running at a speed of 30 miles per hour, the force of gravity over 45 G acts on the driver who succumbs to a great shock given to him as by projecting portions of the steering wheel.

It is the pressing need of the hour to convince motorists of the necessity of safety driving in order to reduce the number of accidents involving motor vehicles. No less pressing is the need to provide improvements in the construction of motor vehicles in such a manner that casualties can be prevented from occurring as much as possible should an accident occur.

In view of the foregoing, the present invention contemplates the provision of safety means whereby a shock given to drivers by steering wheels can be reduced as much as possible when collisions occur.

Accordingly, the principal object of the present invention is to provide shock absorbing steering wheel means for motor vehicles which is adapted to relieve drivers of shocks and reduce casualties which they might suffer once accidents occur.

Another object of the invention is to provide shock absorbing steering wheel means of the type described which is economical to install because it can be readily mounted in not only newly manufactured vehicles but also vehicles that are now in use without requiring any special adjustments or remodelling.

According to the invention, there is provided shock absorbing steering wheel means for motor vehicles comprising a pipe joint connected at one end thereof to the upper end of a shaft of a steering gearing, a sleeve threadably connected at one end thereof to said pipe joint at the other end thereof, a steering wheel shaft slidably received in said sleeve and formed to provide a tapered portion at one end thereof which is snugly fitted in a complementary tapered portion formed on the inner wall of the sleeve, said tapered portions of the steering wheel shaft and the inner wall of the sleeve being formed to provide keys and key ways thereon respectively or vice versa which are fitted one into the other and extend axially toward the steering wheel, and a waved coil spring having elevations and depressions of a wavy configuration formed on the inner peripheral seating surface of each turn of the coil and received in said sleeve for normally urging the steering wheel shaft upwardly, such steering wheel means being characterized in that said pipe joint and said sleeve are slidable but not rotatable relative to said steering wheel shaft.

The following description sets forth in detail one illustrative embodiment of the invention which is shown in the accompanying drawings in which:

FIG. 2 is a fragmentary longitudinal sectional side view showing essential portions of the steering wheel assembly shown in FIG. 1;

Figure 1:
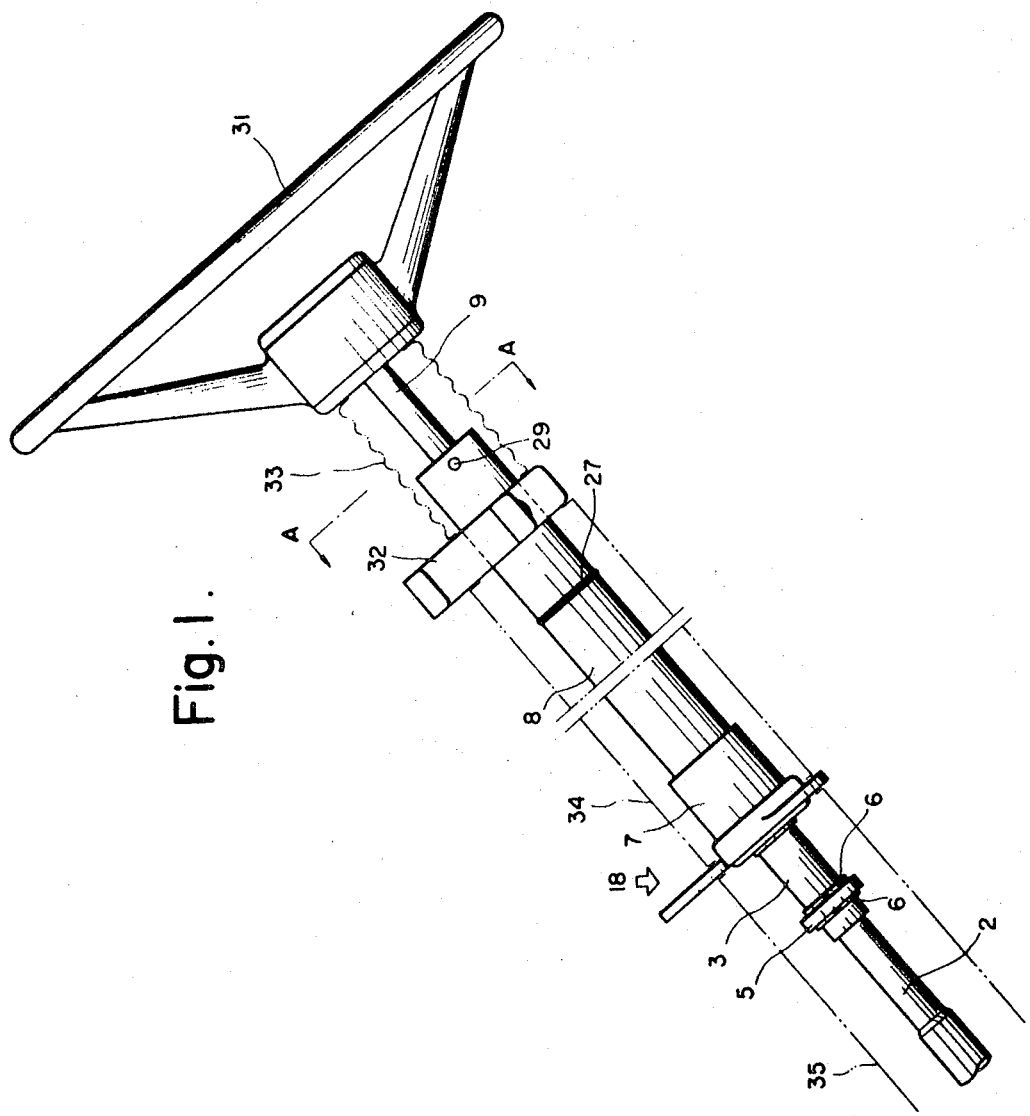
FIG. 1 is a side view of shock absorbing steering wheel assembly of this invention with certain parts being omitted.

FIG. 3 a longitudinal sectional side view showing a bearing portion of the steering wheel assembly of FIG. 1;

FIG. 4 is an end view of a waved coil spring serving as a shock absorber;

FIG. 5 is a schematic side view of the waved coil spring shown in FIG. 4;

FIG. 6 is a view in section taken along the line A—A of FIG. 1 and seen in direction of arrow;

FIG. 7 is a view in section taken along the line B—B of FIG. 2 and seen in the direction of arrow; and FIG. 8 is a view in section taken along the line C—C of FIG. 3 and seen in the direction of arrow.

In the drawings, 1 designates a worm, a constituent member of steering gearing, which has a shaft 2 connected at its upper end to a tubular connector or pipe joint 3 at one end thereof. 4 designates a check pin for connecting said shaft 2 to said pipe joint 3, and 5 is a bush for preventing the check pin 4 from being dislodge. Stop rings 6 are mounted on opposite sides of the bush 5 to restrain the latter from shifting its position. It will be noted that the shaft 2 is firmly secured to one end of the pipe joint 3 by the members 4, 5 and 6. The pipe joint 3 is formed to provide at the other end thereof a bulge serving as a fitting portion 7 which has an internally threaded portion 7′ on its inner circumferential surface. Said internally threaded portion 7′ threadably receives therein one end of a sleeve 8 to provide threadable connection between the pipe joint 3 and the sleeve 8. A rod 10 firmly connected to a steering wheel shaft 9 is slidably inserted in said sleeve. In other words, the steering wheel shaft 9 and rod 10 extend through the sleeve 8 as a unit. The steering shaft 9 is formed to provide a tapered portion 11 in a position at which the shaft 9 is contiguous with the rod 10, and the sleeve 8 is formed to provide a complementary tapered portion 12 on its inner wall in a position corresponding to the tapered portion of the steering wheel shaft 9. Normally, fitting of its tapered portions 11 and 12 one in the other determines the relative positions of sleeve 8 and steering shaft 9.

The rod 10 is formed to provide an externally threaded portion 13 at one end for threadable connection with the steering wheel shaft 9 which is formed to provide at one end thereof an internally threaded portion and a recess 14 for mounting a waved coil spring means subsequently to be described. Key ways 15 are formed in the inner wall of sleeve 8 in the axial direction, and keys 16 are formed on the steering wheel shaft 9 in the axial direction in positions corresponding to the key ways 15. Two pairs of keys and key ways 15, 16 are provided at positions diametrically opposed to each other. A waved coil spring 17 is mounted between the bottom of the fitting portion 7 and the recess 14 in the steering wheel shaft 9 in such a manner that said coil spring surrounds the rod 10. Said spring 17 biases the steering wheel shaft 9 upwardly.

A ball bearing assembly generally designated 18 is mounted on the pipe joint 3 adjacent the fitting portion 7. The bearing assembly comprises an inner race 19, balls 20, and an outer race 21 which can be disassembled. The outer race 21 is formed to provide arms 23 projecting radially and having mounting holes 22 one at each end. A dust cover 24 for covering the center portion of the ball bearing assembly 18 at one side thereof is fitted over the pipe joint 3 and secured in place by means of a stop ring 25. The dust cover 24 is formed to provide a curved portion 26 in the outer periphery thereof so that the cover can be brought into intimate contact with the ball bearing assembly 18. 27 indicates a position in which welding is effected to form the sleeve 8. 28 designates a packing. Holes 29 are formed in the sleeve 8 to receive therein mounting members. 30 is an externally threaded portion formed at the other end of the steering wheel shaft 9 for threadably mounting a steering wheel 31 thereon. A bracket 32 is atached to the sleeve 8 at the upper end thereof. The steering wheel means according to this invention is secured in place when said bracket 32 is mounted at the lower portion of the dashboard of a vehicle and aforementioned ball bearing assembly 18 is attached to the plate in front of the floor. 33 is a bellows-like flexible cover. 34 and 45 are outer coverings.

The waved coil spring 17 employed for absorbing shocks in the steering wheel means according to this invention is formed to provide a number of elevations and depressions of a wavy configuration 17' on the inner peripheral portion of each seat surface. The wavy configuration is such that the elevations and depressions thereof extend continuously from one seat surface to another to provide a gradual helical coil shape. This imparts an added strength to the spring which has a markedly increased strength and can act effectively as a shock absorber by withstanding a great impact. The results of compression tests show that a unit ring which is a component of a waved coil spring 17 can withstand a compressive load of 5 tons. It will be understood that a coil spring of 20 turns will have such a high strength as to be able to withstand a compressive load of 100 tons. A charge of grease will, of course, fill the inside of the sleeve 8 so as to provide lubrication to the waved coil spring 17 and other members and prevent them from getting rusty.

From the foregoing description, it will be appreciated that when a collision occurs and the body of a driver strikes against the steering wheel, the steering wheel shaft 9 moves downwardly in sliding motion in conjunction with the rod 10 within the sleeve 8 against the biasing force of the waved coil spring 17, thereby relieving the driver of a shock and reducing the striking force applied to the driver by the steering wheel. In normal steering operation, the keys 16 formed on the tapered portion 11 of the steering wheel shaft 9 are fitted in the key ways 15 formed in the tapered portion of the inner wall of sleeve 8 (alternatively, the keys 16 may be formed in the tapered portion of the sleeve and the key ways 15 may be formed on the tapered portion of steering wheel). Because of this arrangement, the steering wheel shaft 9 is restrained from rotating relative to the sleeve 8 and no obstacles are presented to the functioning of the safety means. Once the force applied to the steering wheel shaft 9 by collision is removed, the steering wheel shaft will be restored to its original position by the biasing force of the waved coil spring 17, so that rotation of the steering wheel 31 can accurately be transmitted through the steering wheel 9, sleeve 8, pipe joint 3 and shaft 2 to the steering gearing.

As for the shock absorbing action of the waved coil spring 17, the turns of the coil are brought into intimate contact with one another when a compressive force is applied to the spring, with seat surfaces being superimposed. The elevations and depressions of a wavy configuration 17' formed on the seat surfaces cause the force to be absorbed by the smooth outer peripheral portion of the spring. This enables the spring to achieve an excellent shock absorbing effect against a secondary impact.

One advantage of the steering wheel means according ot this invention lies in the fact that it can be installed in not only a newly manufactured vehicle but also a vehicle in use without requiring readjustments, since a shaft on the steering wheel side is connected through a sleeve to a shaft on the steering gearing side. The arrangement that the sleeve and steering wheel shaft are fitted one in the other at the tapered portions can prevent the steering wheel shaft from being inadvertently dislodged. Another advantage is that the provision of a highly resilient waved coil spring greatly increases the effect of absorbing shocks, making it possible for the steering wheel means according to this invention to function satisfactorily as safety means.

While the form of steering wheel means herein described constitutes a preferred embodiment of the invention, it is to be understood that the invention is not limited thereto, and that changes may be made therein without departing from the scope of the invention.

What I claim is:

1. A shock absorbing steering wheel assembly for a motor vehicle comprising, in combination:
   (a) a sleeve member;
   (b) a first shaft having a portion coaxially received in said sleeve member;
   (c) engaged key means on said sleeve member and on said shaft securing the same against relative movement while permitting axial movement of the shaft inward and outward of said sleeve member;
   (d) axially tapering abutment means mounted on said sleeve member and on said shaft for conforming engagement when said shaft is moved axially outward of said sleeve member;
   (e) yieldably resilient means interposed between said shaft and said sleeve member for biasing said shaft outward of said sleeve member and for thereby engaging said abutment means;
   (f) a second shaft;
   (g) connecting means coaxially connecting said second shaft to said sleeve member;
   (h) a steering wheel mounted on one of said shafts; and
   (i) means on the other shaft for connecting the other shaft to a steering gearing;
   (j) said yieldably resilient means including a coil spring having a plurality of turns, each turn having an inner peripheral portion and an outer peripheral portion, the inner peripheral portion being formed with circumferentially alternating depressions and elevations, whereby said inner peripheral portion has a wavy configuration, the outer peripheral portion being smooth.

2. An assembly as set forth in claim 1, wherein said coil spring axially abuts against said connecting means and said abutment means mounted on said first shaft.

3. An assembly as set forth in claim 1, wherein said connecting means include a tubular connecting member fixedly fastened to said second shaft and to said sleeve member.

4. An assembly as set forth in claim 3, wherein said steering wheel is mounted on said first shaft.

References Cited

UNITED STATES PATENTS

| | | | |
|---|---|---|---|
| 1,791,001 | 2/1931 | Rasmussen | 74—493 |
| 2,227,821 | 1/1941 | Burrell | 74—493 |

MILTON KAUFMAN, Primary Examiner

U.S. Cl. X.R.

180—78; 280—87